(12) United States Patent
Dieckmann

(10) Patent No.: US 9,528,757 B2
(45) Date of Patent: Dec. 27, 2016

(54) METHOD AND APPARATUS FOR RAPIDLY CHILLING OR WARMING A FLUID IN A CONTAINER

(75) Inventor: John T. Dieckmann, Belmont, MA (US)

(73) Assignee: TIAX LLC, Lexington, MA (US)

( * ) Notice: Subject to any disclaimer, the term of this patent is extended or adjusted under 35 U.S.C. 154(b) by 1761 days.

(21) Appl. No.: 12/735,873

(22) PCT Filed: Feb. 22, 2009

(86) PCT No.: PCT/US2009/034805
§ 371 (c)(1),
(2), (4) Date: Aug. 23, 2010

(87) PCT Pub. No.: WO2009/105737
PCT Pub. Date: Aug. 27, 2009

(65) Prior Publication Data
US 2010/0319363 A1    Dec. 23, 2010

Related U.S. Application Data

(60) Provisional application No. 61/066,748, filed on Feb. 22, 2008.

(51) Int. Cl.
*F25D 3/12* (2006.01)
*F25D 31/00* (2006.01)
*A47J 36/24* (2006.01)

(52) U.S. Cl.
CPC ............. *F25D 31/007* (2013.01); *A47J 36/24* (2013.01); *F25D 2400/28* (2013.01)

(58) Field of Classification Search
CPC ............ F25D 3/125; F25D 3/105; F25D 3/12; F25D 3/06
USPC ................................. 62/56, 452, 457.9, 460
See application file for complete search history.

(56) References Cited

U.S. PATENT DOCUMENTS

| | | | | |
|---|---|---|---|---|
| 4,078,397 A | * | 3/1978 | Brande | 62/372 |
| 4,580,405 A | * | 4/1986 | Cretzmeyer, III | 62/63 |
| 4,813,243 A | * | 3/1989 | Woods et al. | 62/381 |
| 5,232,095 A | * | 8/1993 | Childers et al. | 206/583 |
| 5,285,657 A | * | 2/1994 | Bacchi et al. | 62/457.9 |
| 5,966,964 A | * | 10/1999 | Pattee | 62/457.4 |
| 6,490,880 B1 | * | 12/2002 | Walsh | 62/457.9 |
| 6,691,530 B2 | | 2/2004 | Lee et al. | |
| 6,945,069 B2 | | 9/2005 | Lee et al. | |
| 2010/0319363 A1 | * | 12/2010 | Dieckmann | 62/56 |

FOREIGN PATENT DOCUMENTS

JP     2005173843 A    6/2005
WO     0177594 A1     10/2001

OTHER PUBLICATIONS

International Search Report; International Application No. PCT?US2009/034805; International Filing Date: Feb. 22, 2009; Date of Mailing: Aug. 28, 2009; 4 pages.

* cited by examiner

*Primary Examiner* — Melvin Jones
(74) *Attorney, Agent, or Firm* — Cantor Colburn LLP

(57) ABSTRACT

A method and apparatus for rapidly chilling or heating a container of liquid is provided. The method may include angularly oscillating the container in the presence of a coolant to impart inertial flow to the liquid contained in the container. Various devices for achieving accelerated cooling of liquids are disclosed.

44 Claims, 10 Drawing Sheets

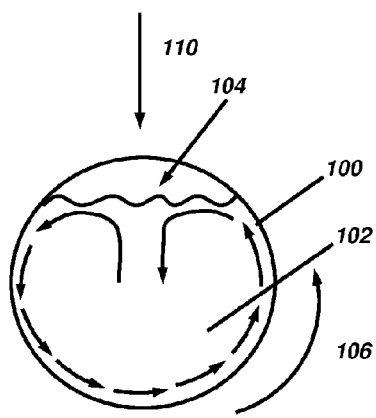 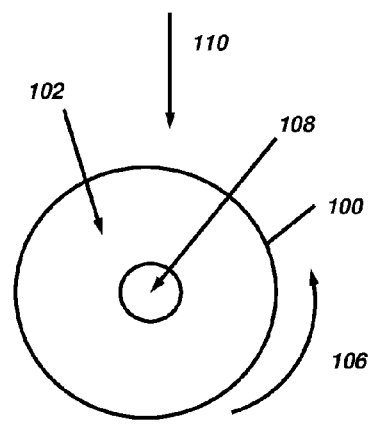
Figure 1A                    Figure 1B

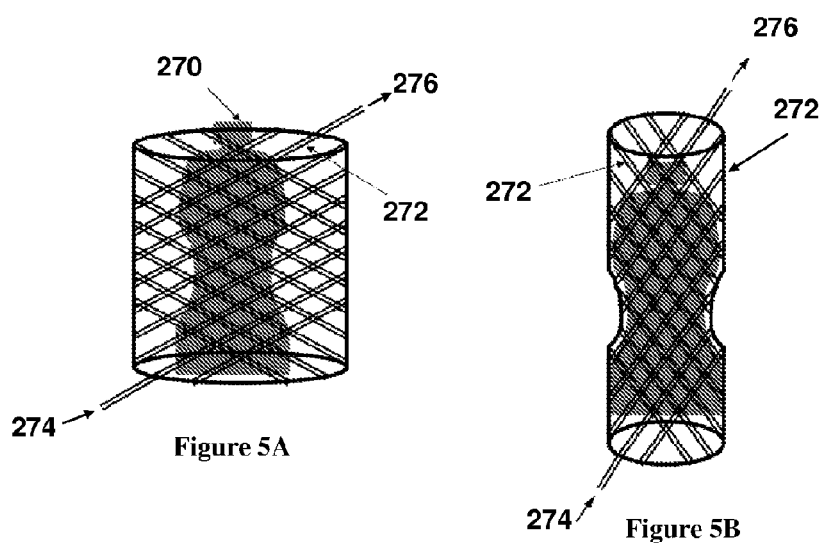

METHOD AND APPARATUS FOR RAPIDLY CHILLING OR WARMING A FLUID IN A CONTAINER

RELATED APPLICATIONS

This application claims priority to, and benefit of, U.S. Provisional Patent Application Ser. No. 61/066,748, filed on Feb. 22, 2008 and titled DEVICES AND METHODS FOR RAPIDLY CHILLING OR WARMING A FLUID IN A CONTAINER, the contents of which are hereby incorporated by reference herein.

BACKGROUND

1. Field of Invention

The invention relates to devices and methods for rapidly cooling or heating a fluid, and in particular, to rapidly heating or cooling a fluid in a conventional container.

2. Discussion of Related Art

The challenge of significantly reducing the time to chill a fluid in a container, compared to conventional means such as placing the container in relatively slow moving or still air in a refrigerated space, is to provide a means of increasing the heat transfer rate from the fluid contents to a cooling medium. A well known means of increasing the heat transfer rate from the outside wall surface of the container is to immerse the container in ice or in a stationary or circulating bath of ice water. Doing so exposes the outer surface of the can to a temperature of 0° Celsius (the triple point of water), with a much higher heat transfer coefficient than would occur with still or slowly moving air.

SUMMARY

In one aspect, a method of reducing the temperature of a liquid in a container is provided, the method comprising angularly oscillating a container of liquid about an axis or a set of axes non-parallel to the long axis of the container to produce inertia driven fluid circulation and exposing the exterior of the container to a coolant or cooling surface that is at a temperature below that of the liquid.

In another aspect a method of reducing the temperature of a liquid in a container is provided, the method comprising rotating a first end of the container in a first elliptical pathway, rotating a second end of the container in a second elliptical pathway wherein the rotation is 180 degrees out of phase with the rotation of the first end, initiating inertial flow of the liquid inside the container, and cooling the surface of the container.

In another aspect, a method of raising the temperature of a liquid is provided, the method comprising angularly oscillating a container of liquid by moving a point on a first end of the container along a substantially elliptical path that is substantially normal to the axis of the container, concurrently moving an opposing end of the container in an elliptical path that is 180 degrees out of phase with the movement of the first end, and exposing the exterior of the container to a medium that is at a temperature above that of the liquid.

In another aspect, a method of cooling an aqueous liquid in a container is provided, the method comprising contacting the container with a coolant or cold surface, and reducing the average temperature of the aqueous liquid in the container by more than 15° C. in less than 30 seconds.

In another aspect, an apparatus for cooling a liquid in a container is provided, the apparatus comprising a gimbal constructed and arranged to support the liquid container and allow for angular oscillation of the container, a rotation rod positioned to contact an end of the container, the rotation rod constructed and arranged to oscillate the end of the container in an elliptical pathway, a motor for driving the rotation rod so that a distal end of the rod is moved along the elliptical pathway, and a coolant source constructed and arranged to be put in contact with the outer surface of the container.

In another aspect, an apparatus for cooling a liquid in a container is provided, the apparatus comprising a first rotation rod constructed and arranged to contact a first end of the container, a second rotation rod constructed and arrange to contact a second end of the container, a motor operatively connected to the first rotation rod to drive the distal end of the rotation rod in an elliptical path, a motor operatively connected to the second rotation rod to drive the distal end of the rotation rod in an elliptical path at 180° out of phase with the first rotation rod, and a coolant source constructed and arranged to be put in contact with the outer surface of the container.

In another aspect, an apparatus for cooling a liquid in a container is provided, the apparatus comprising means for angularly oscillating a container of fluid about an axis or a set of axes non-parallel to the long axis of the container, and means for cooling the container of fluid while it is being angularly oscillated.

In another aspect, an apparatus for cooling a liquid in a container is provided, the apparatus comprising a holder constructed and arranged to grasp an end of the container a drive disc, an internal gear operatively connected to the drive disc, a stationary external gear having an inner edge meshed with an outer edge of the internal gear, a pivotally mounted shaft connecting an eccentric point on the internal gear with the holder, a gimbal constructed and arranged to support the container, and a coolant or cooling surface positioned to cool the container.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 1 is an illustration of limits on heat transfer improvements that can be achieved by known rapid chilling devices using rotation of the container about the long axis.

FIG. 5 is an illustration of flexible tubing arranged or woven in a cylindrical mesh or membrane with the ability to expand and contract around a container.

DETAILED DESCRIPTION

Figure 2:
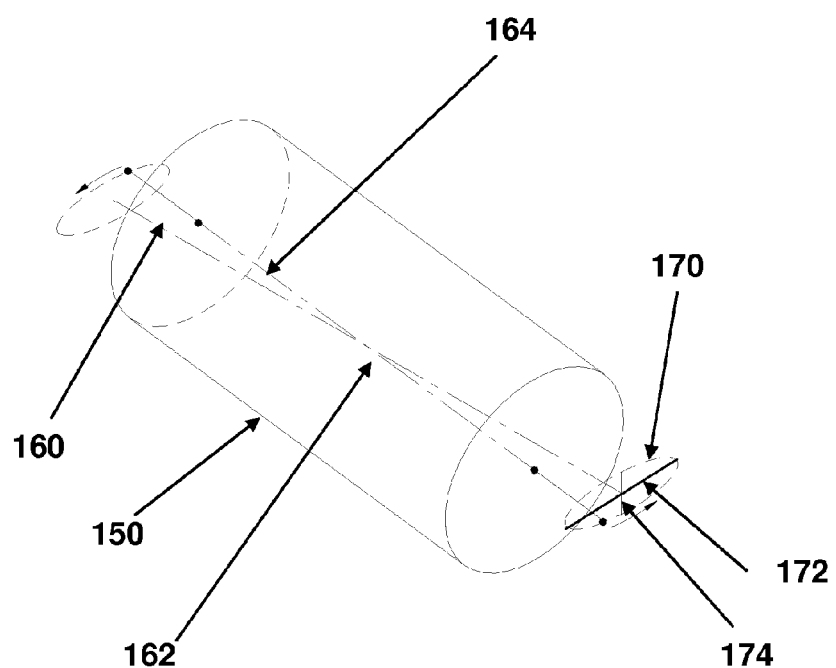
FIG. 2 is an illustration of an exemplary non-rotating motion used to enhance cooling or heating of a container

This invention is not limited in its application to the details of construction and arrangement of components or compounds set forth in the following description, including the various examples, or illustrated in the drawings. The invention is capable of other embodiments and of being practiced or of being carried out in various ways beyond those exemplarily presented herein. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

In one aspect, a method is provided that increases the rate at which a liquid in a container can be chilled and/or heated. The bulk of this disclosure is directed to cooling of liquids but it may be just as applicable to the heating of fluids. The fluid convection circulation in the container can be accelerated to provide for improved heat transfer between the fluid and the walls of the container. The liquid may be, for example, a beverage in a can or bottle. Liquids such as beverages may be cooled from room temperature to less than 5° C. in less than a minute, and carbonated beverages may be cooled without inducing foaming of the beverage. Thus, the beverage may be quickly cooled without adversely affecting the appearance, taste or presentation of the beverage. Thermal transport in the container may be improved by applying an oscillatory motion to the container in a manner that induces inertial movement of the fluid therein and relative motion between the fluid contents and the inner wall of the container. Specifically, the oscillatory motion may include rotating one end of the container in a pattern while the opposed end of the container is rotated in a pattern that is 180 degrees out of phase with the motion of the first end. In one set of embodiments the longitudinal axis of the liquid container may trace an ellipse while the container is being oscillated. The center point of the axis (or another point inside the container), which may be the centroid of the container/liquid, may remain stationary, or close to stationary during the oscillation. While rotated, the container may be contacted with a coolant, such as a chilled fluid, or a cooled surface, such as a bladder or tube that contains a coolant. The chilled fluid may be a liquid, a gas or a slurry. The cooled surface may be flexible (e.g., a plastic bag) or stiff (e.g., a metal heat exchanger).

In another aspect, an apparatus is provided that is constructed and arranged to expose a liquid container to a coolant (or alternatively a heating fluid) while angularly oscillating the container around an axis that is not parallel to the longitudinal axis of the container. In some embodiments, the apparatus can rotate a first end of the container in an elliptical pathway while rotating the opposing end in a similar pathway in the opposite direction.

In another aspect, various cooling (or heating) systems are provided. The cooling systems may include, for example, immersion in an appropriate fluid, cooling or heating by a moving fluid (gas or liquid) such as from gas and/or fluid jets, vaporization of a cooling fluid on the outside wall of the container, or physical contact with a cooled or heated surface such as a bladder, coil or tube. In some embodiments, the container may be enclosed in a flexible membrane to prevent contact between the container and the cooling or heating medium.

In order to achieve rapid cool down of a fluid in a container, it may be helpful to enhance the thermal transport from the fluid to a heat sink, for example, on both the exterior and interior surfaces of the container. On the exterior surface of the container, a cooling medium/media, such as a gas, a liquid, and/or solid, is cooled to a substantially lower temperature than a desired temperature for the liquid. For example, the temperature of the cooling medium can be less than −20° C. when the target temperature for the liquid is 4° C. The external surface of the container can cool rapidly due to the large temperature difference between the container and the cooling media. To keep pace with the rapid external cooling rate, it is necessary to increase the forced convection heat transfer coefficient between the fluid contents of the container and the inside wall surface of the container. While the container is being cooled, a non-rotating motion can be applied to the container.

Many quick beverage cooling devices achieve increased forced convective fluid movement relative to the inside wall surface of the container and improved heat transfer between the fluid in the container and the inside wall surface of the container by rotating the container about its long axis, often with the long axis (axis of rotation) oriented horizontally. Rotational methods typically provide very limited heat transfer from the fluid contents of the container to the inside wall surface of the container. As illustrated in FIG. 1A, and without being bound by theory, the heat transfer enhancement on the inside of a container provided via axial rotation of the container about its long axis is based on shear created by the relative motion of the container 100 to the fluid contents 102, with the bulk fluid contents kept stationary by a combination of gravity (arrow 110 points downward) and the lower density vapor space 104 in the container. As container 100 rotates (counter clockwise as illustrated, but clockwise rotation is functionally equivalent), cold fluid close to the surface is carried around and upward on the right side by shear toward vapor space 104 and to the free surface between fluid contents 102 and vapor space 104. Due to its higher density, the cold fluid tends to sink into and mix with the warmer bulk fluid (i.e., natural convection driven flow), while warm fluid is displaced toward the surface and entrained into the surface layer that is moving downward on the left side as container 100 rotates. The warm fluid entering this surface layer is carried along by the rotation and is cooled due to its close proximity to the cooled surface of the container. Enhanced heat transfer between the surface of the container and the fluid contents is largely dependent on the interaction of this shear induced fluid movement and natural convection flow of cold fluid back into the bulk fluid. The strength of this combination of effects can be quite limited. The heat transfer between the surface of the container and the fluid contents increases as the rotation speed is increased, reaches a maximum at a relatively low rotation speed, and then decreases with further increase in speed. As shown in FIG. 1B, near the rotation speed of container 100 where maximum heat transfer is reached, the rotating shear begins to spin the fluid contents 102 at sufficient speed that the centrifugal force exceeds gravity and the fluid is forced out to the container wall and a vapor core 106 is formed down the centerline of the container. When this occurs, no enhancement of relative motion between the fluid and container inside wall is obtained and thus little or no heat transfer enhancement is obtained. This can result in ice formation on the inner surface of the container, resulting in a decrease in heat transfer. Furthermore, if the contents of the container are a carbonated beverage, ice formation can provide nucleation points for carbon dioxide to come out of solution, causing the beverage to foam over when the container is opened.

As used herein, "rotation" means continuous rotary motion of a container about its long axis in the same direction. "Non-rotational oscillation" means repetitive motion of a container about an axis without traversing 360° and/or reversing direction periodically.

As described herein, a set of specified container motions can act on the inertia of the fluid to cause fluid motion relative to the inside wall of the container that may not be limited by either the strength of gravity and/or by natural convection driven fluid movement. A range of motions that can be characterized as angular oscillations about any axis (or axes) that is not parallel to the long axis of the container can achieve inertia driven fluid circulation. For any given set of angular oscillatory motions, increased inertia driven circulation can be driven by increasing the frequency and/or amplitude, because the effect does not rely upon gravity or shear. FIG. 2 provides a schematic view of one embodiment of a container being subjected a preferred angular oscillatory motion. During motion, the curve 170 traced by the longitudinal axis 164 of the container 150 at both ends of the container is an ellipse, with each moving 180 degrees out of phase with the other end. In other embodiments, the curve may have any degree of eccentricity, for example, from a circle (eccentricity=0) to a straight line (eccentricity=1). Elliptical motion 170 is a combination of two angular oscillatory motions about two axes perpendicular to the long axis of the container, 172 in the horizontal plane as illustrated plus 174 in the vertical plane as illustrated. In one set of embodiments the ratio of these axes may be that of any ellipse and, in specific embodiments, the ratio of the two axes may be greater than 1:1, greater than 2:1, greater than 3:1 or greater than 5:1. In many cases it is preferred that significant movement occur along both axes to promote inertially driven fluid, so the ratio of the two axes may be less than 100:1 or less than 50:1. For some embodiments, e.g., cooling common beverage containers such as 12 oz cans or 16 oz bottles, the linear "length" (along one axis of the oscillation pathway) of the oscillation may be in the range of 1 cm to 20 cm, 1 cm to 10 cm or 1 cm to 5 cm. Similarly the linear "width" (along the second axis of the oscillation pathway) is typically shorter than the length and may be, for example, 0.25 cm to 10 cm, 0.5 cm to 5 cm, or 1 cm to 3 cm. In other embodiments, each end of the container can independently trace any open or closed curve that might not be an ellipse, at any frequency, and at any phase offset. This motion does not require container rotation about any of the three axes, nor is the induced fluid motion influenced significantly by rotation or the lack thereof. In some embodiments, the angular oscillatory motion can be accompanied by concurrent rotation of the container, but it is typically not necessary.

Many variations in the angular oscillatory pattern produce inertially driven fluid circulation and the scope of the disclosure is not limited to any particular set of such angular oscillations about axes not parallel to the long axis of the container.

The angular oscillations of the container at finite amplitude about an axis normal to the long axis can produce mixing interior to the container, enhance transport and reduce cool-down time. Fluid mixing inside the container is driven by the accelerations associated with the non-rotational oscillation and the resulting body forces on the fluid, combined with the buoyancy effect of temperature gradient induced density variations in the fluid content of the container. This motion can be varied so that the ends of the container follow any closed or open curve. Opposite ends of the container oscillate out-of-phase as illustrated in FIG. 2. This motion is similar to when a fluid-filled bottle is oscillated in the manner described and a strong vortex flow forms. If the same container is oscillated in a linear manner, internal fluid circulation and mixing are enhanced relative to the levels that can be obtained by rotation about the long axis, but no vortex forms. The vortex can substantially improve mixing of cold fluid with warm fluid in the container and thereby reduces cooling times. The rapid mixing and fluid motion can also inhibit the formation of ice crystals on the interior surface and in the fluid. As a result, there is little or no foaming of a carbonated beverage when the container is opened. Because the accelerations associated with the non-rotational oscillation are typically much greater that the acceleration of gravity, the orientation of the container and of the oscillation axis relative to gravity have negligible effect and, therefore, any convenient orientation may be chosen. Oscillations may proceed at any frequency capable of producing inertial flow in the container and may vary with, for example, the container, the fluid and the path of the oscillation. Rates of oscillation that may be useful with various embodiments include, for example, 0.5 cycles/sec, 1 cycle/sec, 2 cycles/sec, 3 cycles/sec, 5 cycles/sec and 10 cycles/sec.

In order to achieve the selected cooling time, a sub-freezing external cooling source may be used. In one set of embodiments, a step of applying ultrasound to the container can be used to dislodge any ice crystals from the interior surface of the can. Ultrasound may be applied concurrently with the mixing process. The ice crystals can then move into the bulk fluid, melt, and thereby improve cooling. Additionally, removal of ice from the interior surface can improve heat transfer to the cooling medium since a layer of ice has a lower thermal conductance than moving water and acts as an insulator, reducing the internal thermal film coefficient.

Devices and methods for transferring heat to or from the surface of the container are also provided. Such devices and methods include, for example, immersion of the container in an appropriate fluid, cooling or heating by gas and/or fluid jets, vaporization of a cooling fluid on the outside wall of the container, and/or physical contact with a cooled or heated surface, all while the container is in motion. In some embodiments, the container is enclosed in a flexible membrane to prevent contact between the container and the cooling or heating medium.

Figure 3:
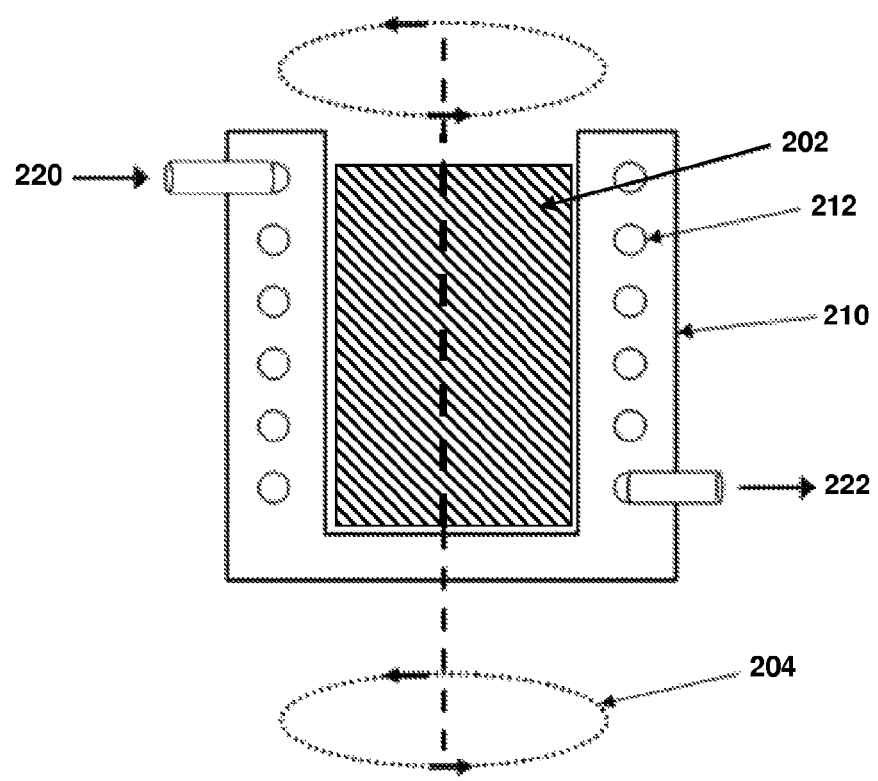
FIG. 3 is an illustration of a 12 ounce beverage container cooled in a close fitting metal heat exchanger.

A variety of cooling (or heating) media and devices may be used with various embodiments. For some containers that have a well defined geometry, such as a 12 ounce aluminum can, or certain proprietary containers, a heat exchanger that fits snuggly around the container can be used. One embodiment of such a heat exchanger system is shown in the cross-sectional view provided in FIG. 3. The entire heat exchanger 210 can be moved in an oscillatory motion, for example the 180 degree out of phase elliptical motions 202 and 204 of each end, imposing the same motions on container 200 to enhance the inside heat transfer. In some embodiments, the heat exchanger 210 includes a metal for good thermal conductivity between coolant tubes 212 and the interior surface of the heat exchanger. The surface that contacts container 200 may be smooth to provide for maximum surface contact for good thermal transfer. The heat exchanger can be cooled to a selected temperature by a cooling fluid entering at fluid inlet 220 and exiting a fluid outlet 222. The cooling fluid may be a boiling refrigerant (e.g., CFC's, HCFC's, ammonia) or an intermediate cooled fluid, such as denatured ethanol, a water-methanol mixture, various glycol mixes, Paratherm CR®, or a solution containing a freezing point-reducing salt, such as calcium chloride, for example. In embodiments used to cool a beverage preferred cooling fluids may have a freezing point below 0° C. In some embodiments the cooling fluid or cooling surface may have a temperature greater than −200° C., greater than −100° C., greater than −75° C., greater than −50° C., greater than −40° C., greater than −30° C. or greater than −20° C.

For containers of variable geometry, such as most bottled beverages, a directed air and/or fluid (e.g., a liquid) flow can be aimed at the surface of the container. The air or other fluid may be flowed at the beverage container while the container is being oscillated.

Figure 4A:
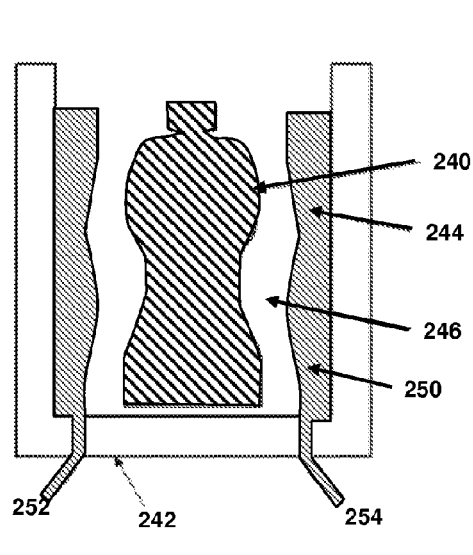
FIG. 4 is an illustration of a flexible bladder used to encase the container.
Figure 4B:
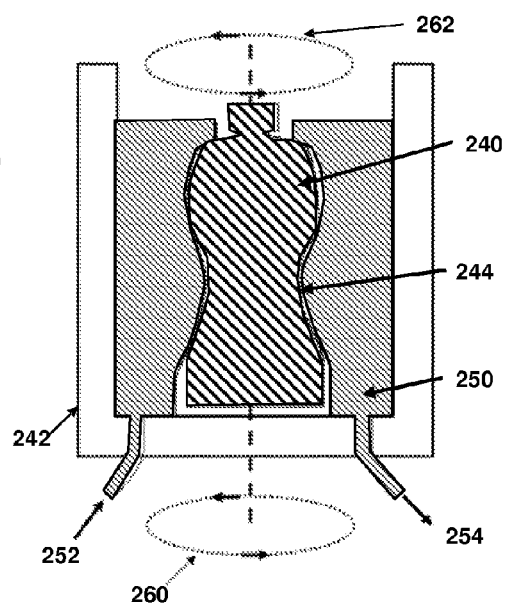

FIG. 4 illustrates a flexible bladder 244 being used to encase a container 240 wholly or partially. In some embodiments, bladder 244 is constructed of a tough, flexible polymer. Suitable polymers include, for example, thermopolymers such as polyethylene, polypropylene and polyvinyl chloride. Other useful polymers include polyurethanes and laminate films such as Mylar®. Bladder 244 forms a cavity 246 into which container 240 is inserted. In use, an opening into cavity 246 in bladder 244 can be expanded to allow the easy insertion of the container 240 to be cooled. At initiation of a cooling cycle, bladder 244 can be slightly pressurized to contract around container 240, forming a low thermal resistance contact with container 240. Cooling fluid 250 can flow through the bladder to cool the container, entering and leaving through inlet 252 and outlet 254. Bladder 244 can permit the use of a liquid coolant while not wetting the container. Also, with bladder 244 having an appropriately sized cavity, containers of different dimension, such as metal cans and plastic bottles, can be accommodated. Bladder 244 may be inflated to a predetermined pressure (rather than a specific volume) to provide good contact with the container surface while maintaining flexibility regarding a range of container shapes and sizes. While cooling is in progress, the container can undergo the preferred motion 260, 262 while bladder 244, or a portion of bladder 244, remains substantially stationary, or both the bladder 244 and container 240 can undergo the preferred motion.

In another set of embodiments, the container to be cooled can be placed in a flexible bag. The bag with the container in it can be immersed in a cooling media. The bag can prevent the container from coming into contact with the cooling media. The bag can be disposable after using once or a few times.

The container can also be immersed in and contacted with a liquid cooling bath. After sufficient cooling, the container can be removed from the liquid bath, and the liquid from the bath can be removed from the container by washing, evaporation, air blast, or a combination thereof. An example of a cooling bath is a solution of calcium chloride and water. This salt is commonly used as a de-icer, a cooling fluid in commercial applications and as an ingredient in edible pickle brine. The freezing point can be depressed to as low as −51 C (−60 F) for a 29.6% solution of calcium chloride in water, so that this solution is liquid at −34 C (−30 F).

FIG. 5 illustrates flexible tubing 272 arranged or woven in a cylindrical mesh or membrane with the ability to expand and contract around a container 270. A cooling fluid can enter the tubes at cooling fluid inlet 274, flow through the tubes, transferring heat effectively away from the liquid in the container, and exit through cooling fluid outlet 276. The flexible tubing can conform to various container shapes and diameters. When contracted around the container, tubing 272 may deform from a circular cross section to a more flattened, elliptical cross section that can provide for greater surface area contact with container 270. Preferably the tubing should not be deformed to an extent where fluid flow through the tubing is restricted. Appropriate tubing types include silicone and PVC flexible tubing. Flexible tubing 272 may contain an additive or filler used to enhance heat transfer. For example, the tubing may include graphite or metallic particles.

Figure 6:
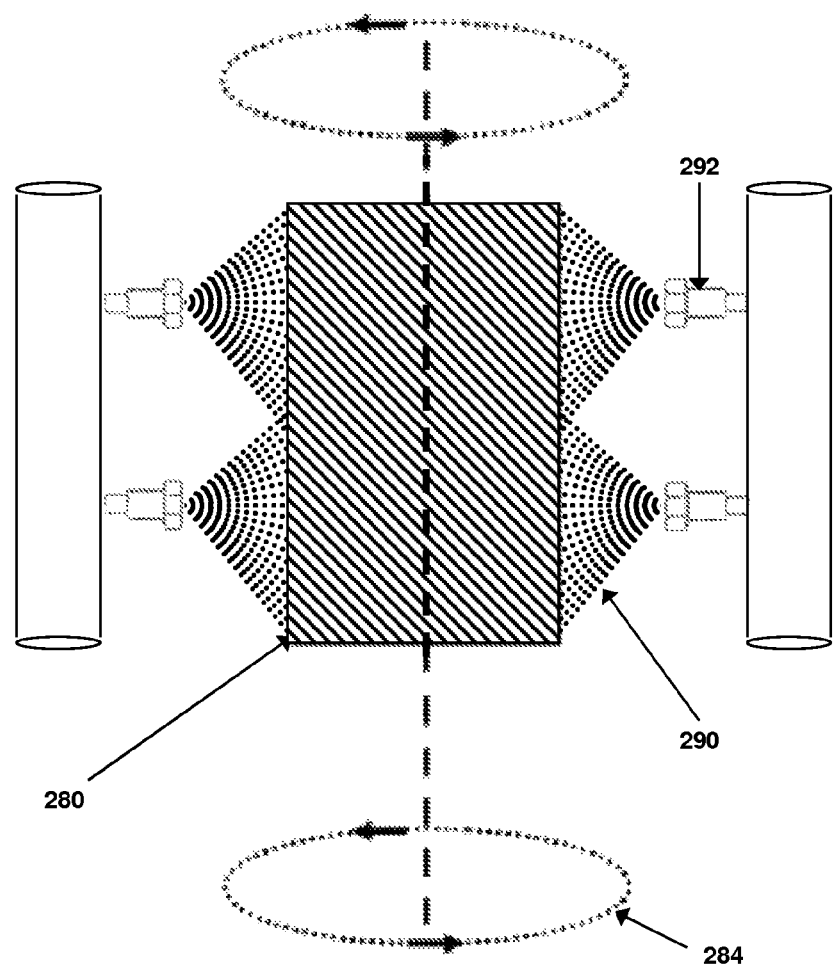
FIG. 6 is an illustration of beverage container cooled by vaporization of a fluid.

FIG. 6 illustrates the process of cooling the exterior of the container by vaporization of a cooling fluid on the outer wall surface of the container. Liquid 290 can be sprayed from one or more spray nozzles 292 onto the surface of container 280, while the container undergoes an oscillatory motion. Liquid 290 vaporizes at approximately the boiling temperature of liquid 290. If the rapid chill device is operated at atmospheric pressure, the boiling temperature will be the atmospheric boiling temperature of liquid 290. If the rapid chill device is operated at a pressure lower or higher than atmospheric pressure, the boiling temperature will be lower or higher, respectively. The heat of vaporization of the sprayed fluid 290 can remove heat from the outer wall surface of the container, providing the desired rapid cooling rate. In addition to providing rapid cooling, a vaporizing fluid leaves no residue on the container. In some embodiments a liquefied gas such as liquid nitrogen or liquid air can be used. At atmospheric pressure these liquefied gases have a low boiling temperature (−196° C.). Liquid nitrogen and liquid air are produced in highly efficient processes and are readily available at low cost.

Refrigeration to maintain the cooling medium at the desired temperature as it absorbs heat from the container and the fluid contents of the container can be provided by any conventional or non-conventional means, including but not limited to vapor compression refrigeration and the vaporization of a liquid cryogen, for example liquid nitrogen or liquid air.

A variety of devices can be used to provide the appropriate motion for the cooling techniques described herein. In a preferred embodiment, the container is moved in a motion such that each end of the container follows a similar curve, with a phase offset of 180 degrees as shown in FIG. 2. In other embodiments, each end of the container could independently trace any open or closed curve, at any frequency, and at any phase offset. The following mechanisms are examples of achieving this motion with an ellipse (including a circle, which is an ellipse with eccentricity=0) as the curve followed by the ends of the container.

Figure 7:
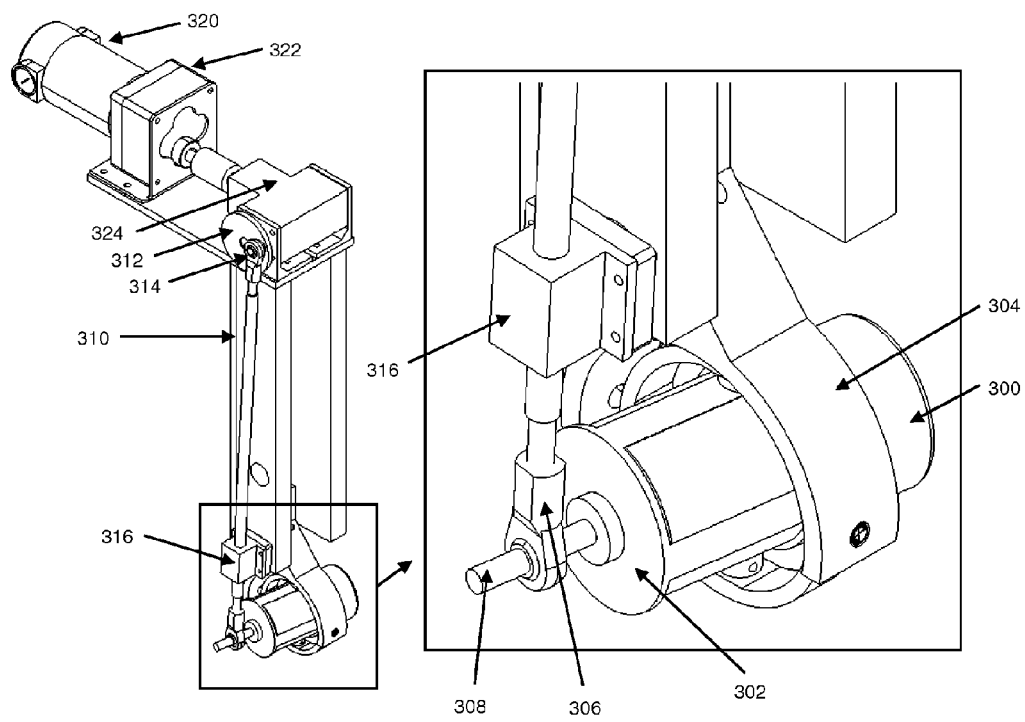
FIG. 7 is a drawing of an embodiment of a one-sided actuation mechanism capable of executing an exemplary motion of a container.

FIG. 7 provides an isometric view of one of several preferred embodiments of a mechanism to achieve an elliptical motion at both ends of the container with a phase offset of 180 degrees. Container 300 is held in container holder 302 which is suspended in gimbal 304 so that the center of mass (centroid) is approximately fixed in space. One end of a drive rod 310 follows the circular path of a point 314 on a rotating disc 312. Rotation of rotating disc 312 is driven by motor 320, optional speed reducing gearbox 322 and bevel gear box 324. It will be evident to one skilled in the art that other functionally equivalent mechanical arrangements are possible. The rod passes through a linear bearing 316 that can pivot to follow the angle of the rod. The end of the rod drives the motion of the end of the container holder via rod end 306. The location of this pivoting linear bearing 316, the length of drive rod 310, and the eccentricity of point 314 on rotating disc 312 determines the curve followed by the end of the container. Thus, the curve can be altered by adjusting any one or any combination of these parameters. If the pivoting linear bearing 316 is centered along the length of drive rod 310, the end of the container 300 will move in a circular motion. Alternatively, the end of container 300 moves in an elliptical motion if the pivoting linear bearing 316 is offset from the center of the length of drive rod 310. The connecting rod end 306 attached to the container holder 302 is allowed to slide along a holder shaft 308 to avoid any binding. The end of container holder 302 opposite holder shaft 308 and rod end 306 is clear of any mechanism and can be used to insert and remove container 300.

Figure 8:
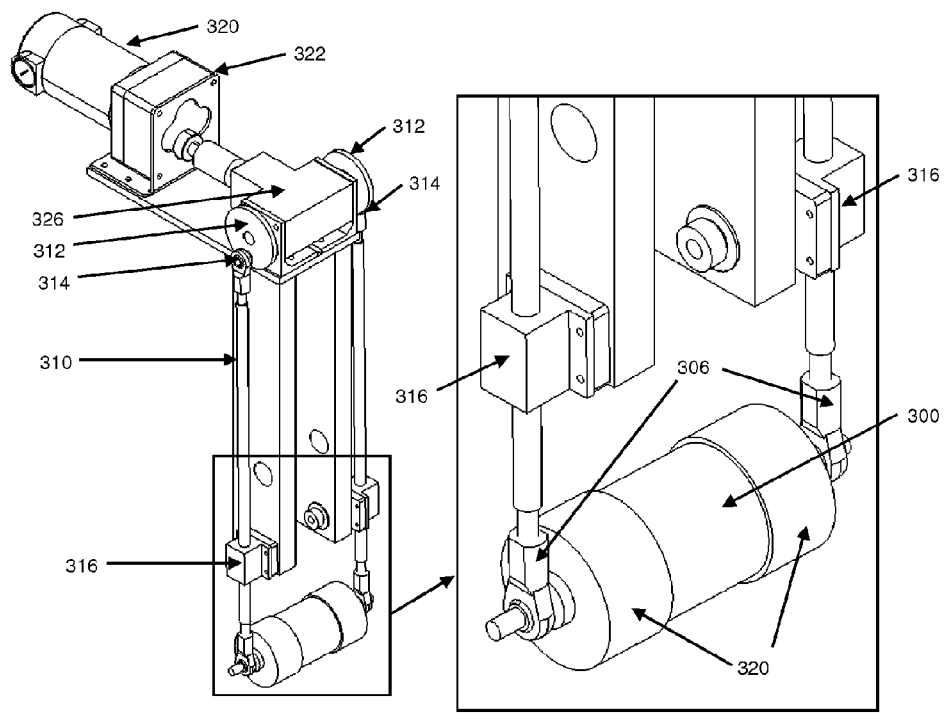
FIG. 8 is a drawing of an embodiment of a two-sided actuation mechanism capable of executing an exemplary motion of a container.

Another embodiment of a mechanism to achieve elliptical motion at both ends of the container with a phase offset of 180 degrees is shown in FIG. 8. Both ends of container 300 are supported by holders 320 that are moving in ellipses (or circles) that are 180 degrees out of phase with each other. The drive rod mechanism 306, 310, 312, 314, 316 is similar to the corresponding mechanism in FIG. 7, except there is no gimbal mechanism supporting the container holder. Instead, the container is supported by a second holder 320 and driven by a second drive rod mechanism on the other end of container 300. Holders 320 may fit over the ends of the container, as shown, or in alternative embodiments may be configured to fit inside the indent that is typically provided at each end of a beverage can. Each of the two rods is connected to rotating discs 312 that are fixed to the same axle. This can be accomplished with a bevel gearbox 326 with one input and two outputs. The two outputs from this bevel gearbox rotate in the same direction. Similarly, if each pivoting linear bearing 316 is centered along the length of its respective drive rod 310, the ends of the container can move in a circular motion. The container is allowed to slide axially in one or both holders to account for the change in distance between the holders over each cycle.

Figure 9A:
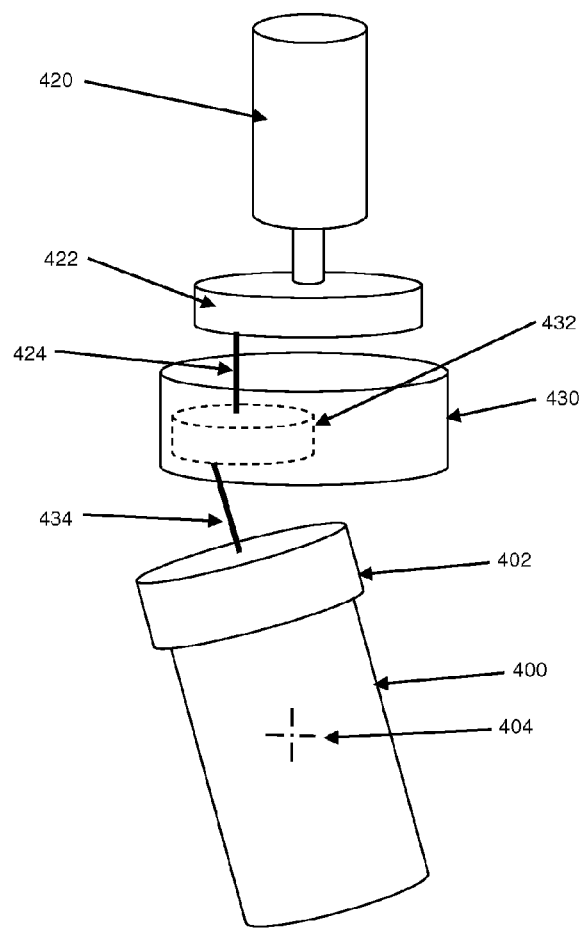
FIG. 9 is a drawing of an embodiment of a Cardan gear actuation mechanism capable of executing an exemplary motion of a container.
Figure 9B:
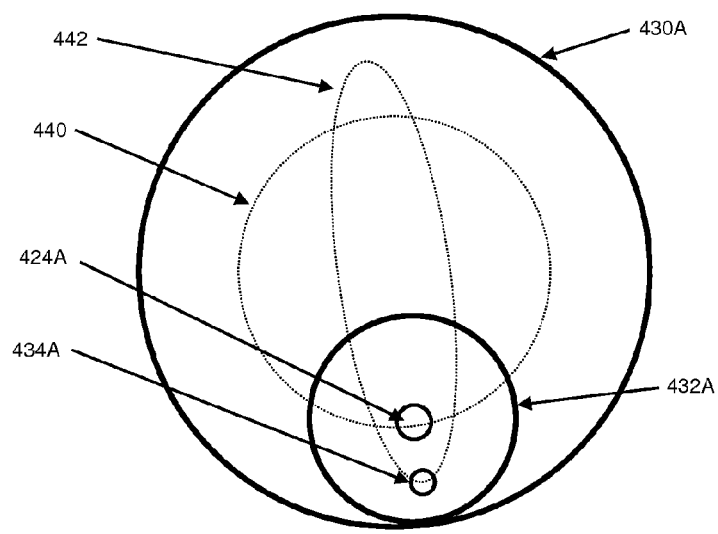

Another preferred embodiment of a mechanism to achieve elliptical motion at both ends of the container with a phase offset of 180 degrees is shown in FIG. 9A. A Cardan gear drive can be used to move the container in the desired elliptical motion at both ends of the container in a small space. A small internal gear 432 rotates around the inward facing teeth a larger external fixed gear 430. The center of the internal gear moves in a circular path and can be driven by a motor 420, a drive motor disc 422 and a connecting shaft 424. Most of the other points on the internal gear can move in an elliptical path and can drive the holder 402 attached to one end of the beverage container 400. A gimbal 404 (like gimbal 304 shown in FIG. 7) can be used to approximately fix the container center of mass in space. This Cardan-like mechanism can also be flipped so that it is below the beverage container, depending on how the container is placed in or removed from the apparatus. FIG. 9B illustrates the kinematics of the mechanism. Edge 432A of internal gear 432 meshes with inner rim 430A of fixed gear 430. Connecting shaft 424 (driven by drive motor disc 422) joins internal gear 432 at center 424A which follows circular path 440 while gimbaled connecting shaft 434 joins internal gear 432 at off center position 434A and follows elliptical path 442, thus driving holder 402 in an angularly oscillating elliptical pathway.

In another embodiment, a dual crank drive device, two crank mechanisms can be positioned 90° (or approximately 90°) apart, and, with the same or different strokes can drive the container axis at the end of the container in an approximately circular or elliptical motion. When the container holder is suspended in a gimbal mechanism as shown in FIG. 7, both ends of the container will follow the preferred elliptical motion at both ends of the container with a phase offset of 180 degrees In another embodiment, a dual solenoid drive including two solenoids or linear actuators 90° (or approximately 90° apart), with the same or different strokes, can drive the container axis at the end of the container in a circular or elliptical motion, or in any other desired path. When the container holder is suspended in a gimbal mechanism as shown in FIG. 7, the opposite end of the container from the driven end will follow the motion of the driven end of the container with a phase offset of 180 degrees. When both ends of the container are driven by dual solenoids, each end can be driven in an independent path.

In another embodiment, the movement of the container may be fluid driven. In a fluid drive, the beverage container holder can be suspended on flexible mounts and moving (or sequentially actuated) fluid jets (most likely of the cooling fluid) can drive the container in the desired motion. Alternatively, a plurality of cooling bladders surrounding the container, similar to the single bladder illustrated in FIG. 4, may be sequentially inflated and deflated with cooling fluid in a sequence providing the desired oscillatory movement of the container and its contents. Separately addressable sets of bladders may be positioned surrounding upper and lower hemispheres of the container.

In another embodiment using a cam drive of gyrating motion, a rotationally oscillating shaft can drive the oscillation of the beverage container holder, which is mounted on a pivot at the end of the shaft, allowing the container to pivot perpendicularly to the shaft. A cam and cam follower can superimpose a gyrating motion on the rotational oscillation.

The devices and methods described herein can be used in a variety of applications. For example, a beverage vending machine can utilize the rapid chill/warming device. A user can choose an item that is initially at ambient temperature. The item can automatically enter the cooling/heating chamber of the rapid chill/warming device and be delivered to the user once the desired temperature is reached. The vending machine can store many items at ambient temperature until the user needs them to be cooled or heated. In some embodiments, for example when the cooling process uses evaporation of a liquefied gas as the coolant, the vending machine may be capable of vending cold beverages without a compression refrigeration system and, in some cases, without the need for line voltage. Thus, beverages may be stored for long periods of time without incurring refrigeration costs while still providing a chilled beverage on demand.

Another application includes a residential refrigerator/freezer that can have the rapid chill device integrated into its system. A user can chill a beverage on demand by placing the container in a sleeve on the inside or outside of the refrigerator/freezer. The rapid chill device can use the same refrigeration system as the refrigerator/freezer or have a separate colder system.

Another application includes a stand-alone rapid chill/warming device that can contain an opening (e.g., slot, hatch, door) for one or more beverage containers. The user can place the ambient temperature container(s) in the device through the opening and remove the container(s) once the desired temperature is reached.

The devices and methods described herein may also be used in the laboratory. For example, a biological sample may be quickly chilled to cease biological activity while avoiding injury to cells that may otherwise be caused by excessive agitation or ice crystal formation.

Figure 10:
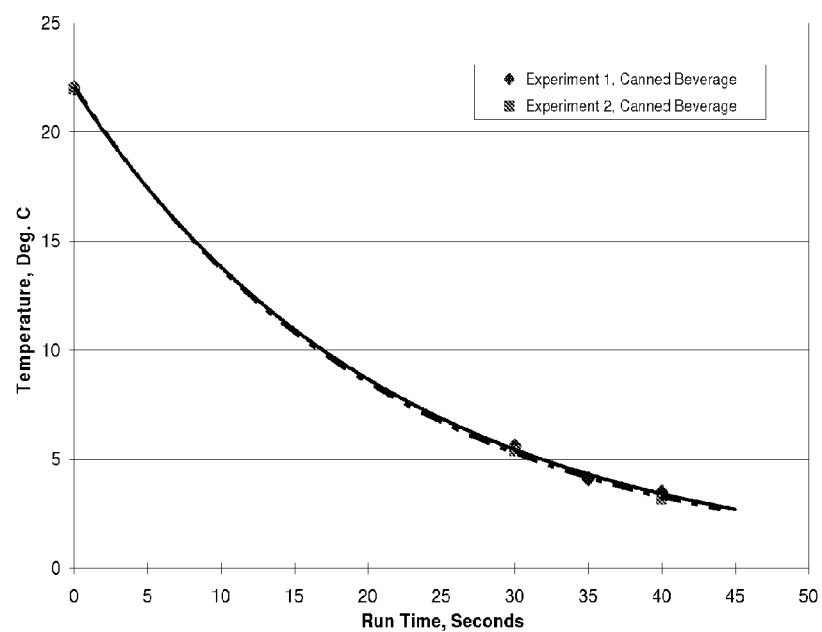
FIG. 10 provides results in graphical form showing the cooling rate of achieved by one embodiment of the invention.

To demonstrate the efficacy of one embodiment of the invention an experiment was designed to determine how quickly a 12 ounce canned carbonated soft drink beverage could be cooled from ambient to below 5° C. The can was secured in the device shown in FIG. 7 and was sprayed with liquid nitrogen (as in FIG. 6) as it was angularly oscillated in an elliptical pattern at a rate of about 3 cycles per second to generate inertial flow of the liquid. The elliptical pattern had a vertical axis of about 3.75 cm and a horizontal axis of about 1.25 cm. The initial temperature of the fluid and the can was 22° C. In one set of tests fluid temperature was measured after 30 seconds and in another set of tests it was measured after 40 seconds. As illustrated in the graph shown in FIG. 10, the liquid cooled to about 5° C. in 30 seconds and to about 3° C. in 40 seconds. The liquid showed no signs of ice particle formation. These results indicate quick chilling of a beverage without the agitation or ice formation that can cause foaming and overflow in a carbonated beverage.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A method of reducing the temperature of a liquid in a container, the method comprising:
   angularly oscillating a container of liquid about an axis or a set of axes non-parallel to a long axis of the container to produce inertia driven fluid circulation; and
   exposing an exterior of the container to a coolant or cooling surface that is at a temperature below that of the liquid.

2. The method of claim 1 wherein angularly oscillating comprises:
   moving a point on a first end of the container along a substantially elliptical path, the path being normal to the long axis of the container; and
   concurrently moving an opposing end of the container in an elliptical path that is 180 degrees out of phase with the movement of the first end.

3. The method of claim 1 wherein angularly oscillating comprises:
   moving a point on a first end of the container along a path that traces an open or closed curve that is normal to the long axis of the container.

4. The method of claim 3 further comprising moving a second point on a second end of the container along an open or closed curve that is 180 degrees out of phase with the movement of the first point.

5. The method of claim 1 wherein a point within the container does not move along the x, y or z directions.

6. The method of claim 1 wherein the container is oscillated without axially rotating the container.

7. The method of any of claims 1-6 wherein the container is not moved longitudinally along the container's axis.

8. The method of claim 1 wherein the liquid is an aqueous liquid, the container comprises a metal can, and the temperature of the liquid is reduced by more than 15° C. in less than 30 seconds.

9. The method of claim 1 wherein the axis or axes about which the container is oscillated intersects the long axis of the container.

10. The method of claim 1 wherein the liquid comprises a carbonated beverage.

11. The method of claim 1 wherein the coolant or cooling surface has a temperature of greater than −40° C.

12. A method of raising the temperature of a liquid, the method comprising:
   angularly oscillating a container of liquid by moving a point on a first end of the container along a substantially elliptical path that is substantially normal to the axis of the container;
   concurrently moving an opposing end of the container in an elliptical path that is 180 degrees out of phase with the movement of the first end; and
   exposing an exterior of the container to a medium that is at a temperature above that of the liquid.

13. The method of claim 12 wherein angularly oscillating comprises;

moving a point on a first end of the container along a substantially elliptical path, the path being normal to the long axis of the container; and concurrently moving an opposing end of the container in an elliptical path that is 180 degrees out of phase with the movement of the first end.

14. The method of claim 12 wherein angularly oscillating comprises:

moving a point on a first end of the container along a path that traces an open or closed curve that is normal to the long axis of the container.

15. The method of claim 14 further comprising moving a second point on the second end of the container along an open or closed curve that is 180 degrees out of phase with the movement of the first point.

16. The method of claim 12 wherein a point within the container does not move along the x, y or z directions.

17. The method of any of claims 12-16 wherein the container is oscillated without axially rotating the container about its long axis.

18. The method of claim 12 wherein the container is not moved longitudinally along the axis of the container.

19. The method of claim 12 wherein the liquid is an aqueous liquid, the container comprises a metal can, and the temperature of the liquid is reduced by more than 15 degrees C. in less than 30 seconds.

20. The method of any of claim 12 wherein the axis or axes about which the container is oscillated intersects the long axis of the container.

21. A method of cooling an aqueous liquid in a container, the method comprising:

contacting the container with a coolant or cold surface; and reducing the average temperature of the aqueous liquid in the container by more than 15° C. in less than 30 seconds.

22. The method of claim 21 wherein no ice is formed inside the liquid container.

23. The method of claim 21 wherein the temperature is reduced from greater than 20° C. to less than 5° C. in less than 30 seconds.

24. The method of any of claims 21-23 wherein the coolant or cold surface comprises a fluid.

25. The method of claim 24 wherein the fluid comprises a liquid that evaporates on the surface of the container.

26. The method of claim 25 wherein the fluid comprises a liquefied gas.

27. The method of claim 26 wherein the liquefied gas comprises nitrogen.

28. The method of claim 24 wherein the fluid comprises an aqueous solution at a temperature below 0° C.

29. The method of claim 21 wherein the container is contacted with the surface of a bladder containing a chilled fluid.

30. The method of claim 21 wherein the container is contacted with tubing and a coolant is flowed through the tubing.

31. An apparatus for cooling a liquid in a container, the apparatus comprising:

a gimbal constructed and arranged to support the liquid container and allow for angular oscillation of the container;

a rotation rod positioned to contact an end of the container, the rotation rod constructed and arranged to oscillate the end of the container in an elliptical pathway;

a motor for driving the rotation rod so that a distal end of the rod is moved along the elliptical pathway; and a coolant source constructed and arranged to be put in contact with an outer surface of the container.

32. The apparatus of claim 31 wherein the container comprises a beverage can or beverage bottle.

33. The apparatus of claim 31 or 32 wherein the coolant source comprises a fluid.

34. The apparatus of any of claims 31-33 wherein the coolant source comprises a liquefied gas.

35. An apparatus for cooling a liquid in a container, the apparatus comprising:

a first rotation rod constructed and arranged to contact a first end of the container;

a second rotation rod constructed and arranged to contact a second end of the container;

a motor operatively connected to the first rotation rod to drive a distal end of the first rotation rod in an elliptical path;

a motor operatively connected to the second rotation rod to drive a distal end of the second rotation rod in an elliptical path at 180° out of phase with the first rotation rod; and a coolant source constructed and arranged to be put in contact with an outer surface of the container.

36. The apparatus of claim 35 wherein the container comprises a beverage can or a beverage bottle.

37. The apparatus of claim 35 or 36 wherein the coolant source comprises a fluid.

38. The apparatus of any of claims 35-37 wherein the coolant source comprises a liquefied gas.

39. The apparatus of claim 35 wherein the motor connected to first rotation rod is the same motor connected to the second rotation rod.

40. The apparatus of claim 35 further comprising a disc mounted to a driveshaft of the motor, wherein the proximal end of the first rotation rod is eccentrically connected to the disc.

41. The apparatus of claim 35 further comprising a linear bearing through which the first rotation rod passes wherein the portion of the first rotation rod passing through the bearing during operation is not the center of length of the first rotation rod.

42. An apparatus for cooling a liquid in a container, the apparatus comprising:

means for angularly oscillating a container of fluid about an axis or a set of axes non-parallel to the long axis of the container; and means for cooling the container of fluid while it is being angularly oscillated.

43. An apparatus for cooling a fluid in a container, the apparatus comprising:

a holder constructed and arranged to grasp an end of the container;

a drive disc;

an internal gear operatively connected to the drive disc;

a stationary external gear having an inner edge meshed with an outer edge of the internal gear;

a pivotally mounted shaft connecting an eccentric point on the internal gear with the holder;

a gimbal constructed and arranged to support the container; and a coolant or cooling surface positioned to cool the container.

44. A vending machine comprising the apparatus of claim 31.

* * * * *